E. D. RICHARDSON.
THRESHING MACHINE.
APPLICATION FILED MAY 12, 1915.
1,176,488.
Patented Mar. 21, 1916.
2 SHEETS—SHEET 1.
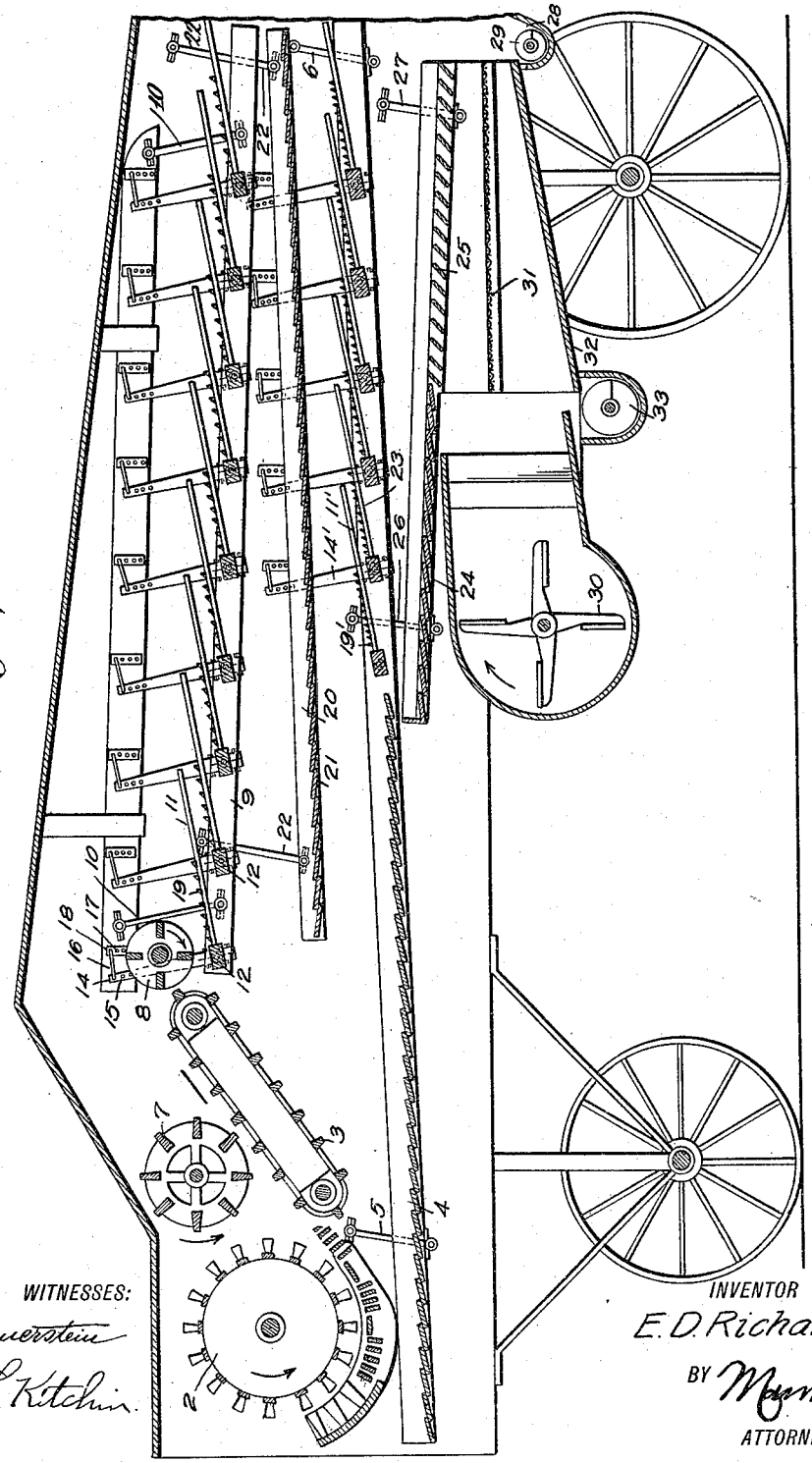
WITNESSES:
L. Hauerstein
A. L. Kitchin
INVENTOR
E. D. Richardson
BY Munn&Co
ATTORNEY

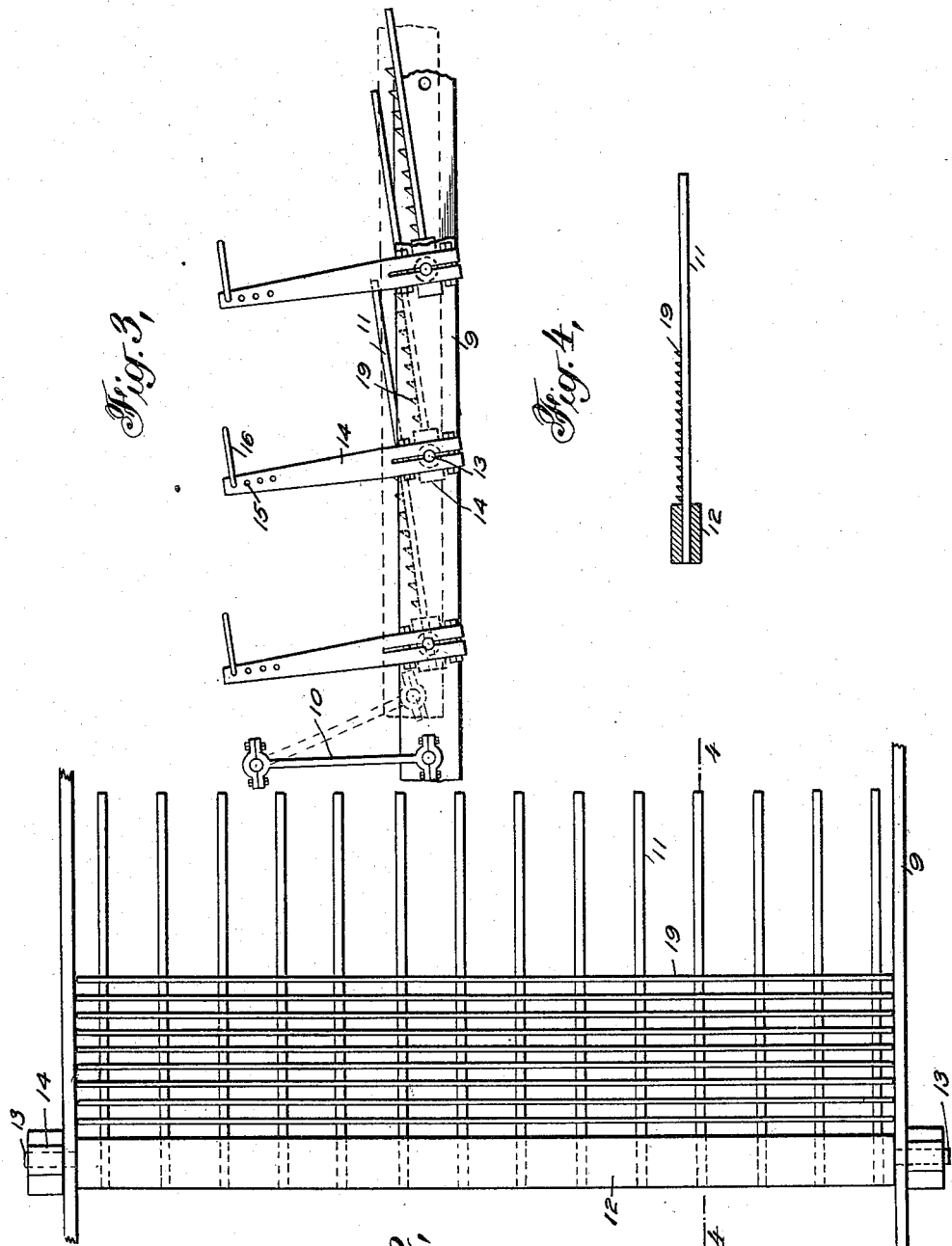

UNITED STATES PATENT OFFICE.

EMMITT D. RICHARDSON, OF CAWKER CITY, KANSAS.

THRESHING-MACHINE.

1,176,488. Specification of Letters Patent. Patented Mar. 21, 1916.

Application filed May 12, 1915. Serial No. 27,540.

*To all whom it may concern:*

Be it known that I, EMMITT D. RICHARDSON, a citizen of the United States, and a resident of Cawker City, in the county of Mitchell and State of Kansas, have invented a new and Improved Threshing-Machine, of which the following is a full, clear, and exact description.

This invention relates to threshing machines and has for an object to provide an improved straw rack associated with an arrangement of chaffer.

Another object in view is to provide a threshing machine with means for increasing the beating action or agitation of the straw, hay and the like during its passage through the machine.

A still further object in view is to provide an improved arrangement of straw racks and chaffers together with a return bottom for causing a thorough agitation of the straw, wheat and chaff and the wheat and chaff separately.

In the accompanying drawings:—Figure 1 is a longitudinal vertical section through the threshing machine disclosing an embodiment of the invention; Fig. 2 is a top plan view of one set of lifting fingers; Fig. 3 is an enlarged fragmentary side view of part of the straw rack, showing in dotted lines the movement of the parts; Fig. 4 is a fragmentary sectional view through one set of lifting fingers, the same being taken approximately on line 4—4 of Fig. 2.

In constructing threshing machines or separators there is provided at the feeding ends means for breaking up in a more or less thorough manner the bundles of wheat, oats or other material and then transporting the same to various agitating and shaking members for shaking out the wheat and other grain and directing said wheat or grain to a discharge screw while the chaff and straw are directed out another discharge opening. The present invention refers only to the arrangement of these agitating and separating means, but for the purpose of illustration and to make the entire construction plain a suitable housing or casing 1 has been shown in the drawings, in the front end of which is arranged a cylinder 2 which receives the matter being fed into the machine and which, as stated, breaks up the same to a certain extent, after which the straw and part of the wheat and chaff pass up the conveyer 3 and part of the wheat and some chaff drop down to the grain pan 4 which is being agitated or moved back and forth, the same swinging on suitable hangers 5 and 6 in the usual manner. The part of the grain which passes up elevator or conveyer 3 is operated on by beater 7 and finally by beater 8, after which it is discharged upon the straw rack 9.

The straw rack 9 is provided with side members supported by any suitable number of swinging hangers 10 whereby the rack may be agitated or swung back and forth quickly and thereby give a proper movement to the fingers 11. A plurality of fingers 11 are secured in each of the bars 12, which bars are provided at their ends with shafts or pintles 13 to which are rigidly secured the arms 14. The arms 14 are provided at their upper ends with apertures 15 in which the connecting rod or link 16 is placed, one end of link 16 being arranged in one of the apertures 15 while the other end of the link 16 is arranged in one of the apertures 17 in plate 18 which is rigidly secured in position in any suitable manner. It will be understood that there is a bar 12 for each set of fingers 11 and that there are preferably a pair of arms 14 for each bar 12, so that when the rack 9 is moved back and forth on its hangers 10 the fingers 11 will be flapped or raised and lowered pivotally in proportion to the movement of the rack and the position of the link 16.

In order to provide a better agitating and separating effect a plurality of slats 19 are secured to each set of fingers 11, as clearly shown in Fig. 2, these slats being preferably triangular in shape in cross section. Preferably the slats 19 on one set of fingers 11 extend from their supporting bar 12 to a point above the next supporting bar, as shown in Fig. 1, thus in effect providing a form of chaffer for assisting in separating the grain and chaff, the fingers 11 taking care of the straw and gradually working the same toward the rear or discharge part of the threshing machine. The various chaff, grain and other matter passing through the straw rack 9 will fall upon the return bottom 20, which may be formed of the usual construction, namely, of suitable side boards and suitable transverse members 21 overlapped as shown in Fig. 1. The return bottom 20 is supported by suitable hangers 22 so that as the same is agitated to move back and forth the grain, chaff and other material will be discharged on to the grain pan 4 near the front end thereof. As the grain pan 4 is being agitated the same will feed the chaff, grain and other matter toward the chaffer 23 which is provided with fingers 11' similar to the fingers 11 on the straw rack and with slats 19' similar to the slats 19 on the straw rack, except that they are preferably arranged closer together. The fingers 11' are flapped or swung back and forth in a similar manner to the fingers 11 on rack 9 so that no additional description of the operating means will be necessary except that the movement is caused by arms 14' constructed and arranged similar to the arms 14. The matter passing through the chaffer 23 will drop either on the short grain pan 24 or on what is known as a shoe chaffer 25. The matter on the short grain pan 24 will be moved on to the chaffer 25 as the chaffer and short grain pan are agitated or moved back and forth. These members are swung on suitable hangers 26 and 27. The matter passing over the end of the chaffer 25 will fall into a suitable trough 28 and will be moved to one side by the return screw 29 which may direct the material to any suitable point, as for instance to a return elevator not forming any part of the present invention. The matter passing through the chaffer 25 will be subjected to a blast of air provided by fan 30 and any light matter will be blown out of the machine in the usual manner, while the heavier matter will strike the screen 31 and part of the same pass off the forward end of the screen and the remaining part pass through the screen to the floor 32. All of the matter passing off the forward end of the screen 31 and striking the floor 32 will gravitate toward the grain screw 33 which will discharge the grain to a suitable discharge point.

The provision of the various lifting fingers 11 and 11' and also the return bottom 20 present means which provide extra agitation and beating of the straw, chaff and the like, so as to thoroughly separate the same and thereby save all of the grain instead of discharging part of the grain out of the straw stacker. Also by providing these extra agitating or separating means the dirt and other objectionable light matter may be more easily separated from the grain by the fan 30 when the same pass in front of the fan.

What I claim is:—

1. In a threshing machine of the character described, a straw rack, means for operating the same, means for feeding straw and grain to the rack, a return bottom for receiving chaff and grain from said straw rack, a grain pan for receiving the chaff and grain from said return bottom, a chaffer for receiving part of the grain and chaff from the grain pan, said chaffer being formed with a plurality of sets of lifting fingers, means for operating each of said sets, slats arranged transversely of each set of fingers, and means for directing the grain from said chaffer to a discharge point, said means including a sieve and an inclined guide.

2. In a threshing machine of the character described, a straw rack provided with sets of lifting fingers, each set of lifting fingers being provided with transverse slats, means for feeding grain, straw and the like to said rack, a chaffer provided with sets of lifting fingers, each set being provided with transverse slats, means for directing the chaff and grain from said straw rack to said chaffer, a sieve, means including a second chaffer for directing grain and chaff to said sieve, means for providing an air blast for separating the chaff from said grain adjacent the sieve, and a discharge member for receiving the grain from the sieve.

3. A straw rack for threshing machines, comprising a pair of side bars, a plurality of rocking bars extending transversely of said side bars, an arm rigidly connected with each of said transverse bars, means for pivotally mounting the opposite end of each arm to the end connected with said transverse bars, a set of lifting fingers arranged on each of said transverse bars, the fingers of one set overlapping the fingers of the next adjacent set an appreciable distance, and a plurality of slats arranged on each set of lifting fingers, said slats being grouped at the end of the fingers adjacent said transverse bars.

4. In a device of the character described, the combination with a threshing machine, of identically constructed straw racks and chaffers, each of said straw racks and chaffers being provided with a pair of side bars adapted to be moved back and forth longitudinally, a plurality of transverse bars pivotally mounted in said side bars, a set of lifting fingers connected with each of said transverse bars, one set of lifting fingers overlapping the next adjacent set approximately half the length of the fingers, a plurality of slats arranged on each set of lifting fingers, said slats being arranged on the half of the sets of fingers nearest the transverse bars so that the slats will extend from one transverse bar to the other, and means connected with each of said transverse bars for causing said sets of fingers to be raised and lowered pivotally when the side bars are reciprocated.

5. In a straw rack for threshing machines, a body adapted to be reciprocated, a plurality of sets of fingers arranged on said body, the fingers of one set overlapping the fingers of the next adjacent set for approximately one half the length of the fingers, a slat structure arranged adjacent one end of each set of fingers, said slat structures extending transversely of the fingers, and means for raising and lowering pivotally said sets of fingers when said body is reciprocated.

6. In a device of the character described, the combination with a threshing machine, of a straw rack provided with a pair of side bars, a plurality of transverse bars pivotally mounted in the side bars, a set of fingers arranged on each of said transverse bars, the fingers of one bar overlapping the fingers of the next adjacent bar for an appreciable distance, a plurality of spaced slats arranged on each set of fingers, said slats extending from one transverse bar to the next succeeding transverse bar, means for rocking said bars, said means including an adjusting link for varying the amount of movement of said transverse bars without varying the movement of the power means, a chaffer of the same construction and arrangement as the straw rack, and means for forcing a current of air adjacent the chaffer whereby the grain and chaff are subject to the action of the air for an appreciable time, the transverse slats retaining the chaff and grain.

7. In a device of the character described, the combination with a threshing machine, of a straw rack provided with a pair of side bars adapted to be moved back and forth longitudinally, a plurality of transverse bars pivotally mounted in said side bars, a set of lifting fingers connected with each of said transverse bars, the lifting fingers on each bar being of such a length as to extend twice the distance between the respective transverse bars so that there will be a great overlap, a plurality of slats arranged on each set of lifting fingers, said slats extending transversely of the fingers and occupying the space on the fingers equal to the distance between adjacent transverse bars, and means connected with each of said transverse bars for causing said sets of fingers to be raised and lowered pivotally when the side bars are reciprocated.

In testimony whereof I have signed my name to this specification in the presence of two subscribing witnesses.

EMMITT D. RICHARDSON.

Witnesses:
W. C. CADY,
MARIE MEENEY.

Copies of this patent may be obtained for five cents each, by addressing the "Commissioner of Patents, Washington, D. C."